: 3,038,783
CONTINUOUS METHOD FOR THE MANUFACTURE OF AMMONIUM CHLORIDE

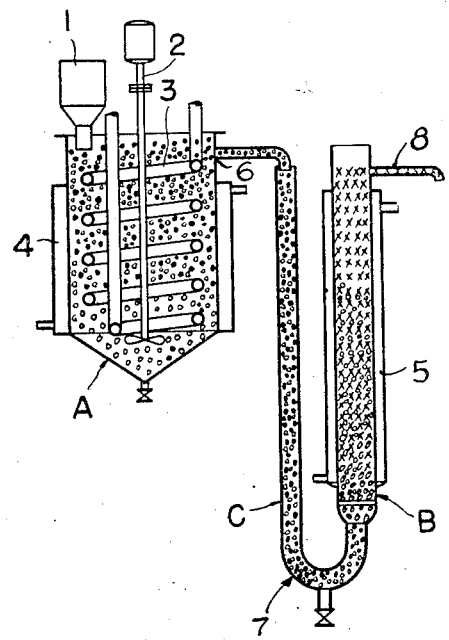

Hideo Arita, Saburoe Yamada, and Toshiaki Yamazaki, Tokyo, Japan, assignors to Asahi Kasei Kogyo Kabushiki Kaisha, Kita-ku, Osaka, Japan, a corporation of Japan
Filed Sept. 22, 1958, Ser. No. 762,571
Claims priority, application Japan Oct. 1, 1957
4 Claims. (Cl. 23—100)

This invention relates to a continuous method and an apparatus for the manufacture of ammonium chloride.

A method comprising subjecting a liquid which is produced by filtering solid sodium bicarbonate obtained from the ammonia-soda process to a suitable treatment, adjusting the composition of the liquor, and thereafter adding a suitable amount of solid sodium chloride thereto to precipitate ammonium chloride, is superior to the conventional ammonia-soda process in both the complete utilization of sodium chloride and the recovery of ammonium chloride.

When the amount of sodium chloride added is insufficient, ammonium chloride precipitates in a small amount, whereby sodium bicarbonate precipitates in a small amount, too. Contrary to this, when the NaCl is present in excess, such excess amount mixes with the ammonium chloride. This not only lessens the commercial value of the ammonium chloride, but also entails the overuse of sodium chloride.

From this standpoint, it is important to dissolve sodium chloride in a liquor under saturated condition. The amount of sodium chloride to be dissolved depends considerably upon the composition and temperature of the liquor, and it is very difficult to measure the composition of the liquor accurately. Such accurate measurement is an important problem in industry.

In the recovery of ammonium chloride, an extreme cooling is necessary for the purpose of cooling the liquor and removing the heat of reaction. Said cooling results in the adherence of crystals of ammonium chloride and the like to the cooling pipe as well as to the cooling wall which obstructs the cooling thereby. Moreover, the corrosive power of the liquor is so great that the use of an usual iron equipment is improper, and thus equipment having a great resistance to corrosion should be used. A lining of synthetic resin having a great resistance to corrosion can not be used because it tends to lower the heat conductivity. Consequently, it becomes necessary to use a special steel, having both great corrosion-resistance and excellent heat conductivity, which presents a serious problem regarding the cost of constructing the apparatus.

An object of this invention is to provide a method and an apparatus therefore, to overcome the above mentioned difficulties, in which a liquor is completely saturated by sodium chloride to precipitate as much ammonium chloride as possible without any excess of sodium remaining in ammonium chloride, and the ammonium chloride is continuously and efficiently produced in a small device while avoiding the adhesion of crystals to the device.

In order that the invention may be fully understood, it will now be described with reference to the accompanying drawing illustrating an apparatus suitable to carry out the present invention.

In the drawing, the reaction vessel A has an external cooler 4, an internal cooler 3 and a strong stirrer 2. Into this reaction vessel, filtrate obtained by filtering solid sodium bicarbonate from the suspension thereof obtained in the ammonia-soda process and solid sodium chloride having a suitable particle size, preferably ranging from about 20 to 100 mesh, are continuously introduced at the entry end 1 thereof to react with each other. The reaction mixture leaves vessel A by way of overflow 6, together with a small amount of the sodium chloride which is always admixed therewith. Thus, ammonium chloride in a flocculent form overflows continuously together with fine particles of sodium chloride. In the drawing, "○ (white circle)" indicates sodium chloride crystals, "● (black circle)" indicates ammonium chloride in flocculent form and "x" indicates ammonium chloride crystals. The reaction vessel A is operated in such a manner that an excess amount of unreacted sodium chloride having a large particle size is always maintained therein. As for sodium chloride to be added, it should have a suitable particle size as described above. If only very fine sodium chloride is present, a great amount of sodium chloride will be included in the overflowing mixture. In order to dissolve such large amounts of very fine sodium chloride completely in the flow separator B of the apparatus, the temperature difference in the latter would have to be so great that it would become practically impossible to construct such apparatus. If, on the other hand, sodium chloride having extremely large particle size is exclusively used, the time of dissolution is prolonged, the apparatus becomes necessarily larger, less sodium chloride overflows, and it becomes difficult to dissolve the sodium chloride under saturated conditions.

The overflowing reaction mixture is transferred from the overflow 6 through a descending pipe C to a gravity separator zone 7 in which it is stripped of the large size particles of sodium chloride due to gravity, whereafter it is continuously passed upwards from the bottom zone of the flow separator B through the latter at a flow rate of 0.3 to 0.9 cm. per second to the discharge 8 provided at the upper end of the separator. A centrifugal separator may be used in place of the gravity separator. At this time, undissolved large size sodium chloride crystals remain in the bottom layer of the flow separator, while an extremely fine sodium chloride is passed with ammonium chloride toward the upper layer of the flow separator, until this fine sodium chloride is dissolved completely in the mother liquor by means of the dropping temperature gradient maintained in the flow separator, and it is thus possible to maintain the sodium chloride dissolved in the mother liquor under saturated conditions throughout the passage of the reaction mixture through the flow separator. To this end, a water jacket 5 is provided outside the flow separator and water is introduced thereto at the upper portion thereof. It is preferable that the temperature gradient maintained is such that the temperature difference between the upper and the lower part of the flow separator is from 2 to 5 degrees centigrade.

The slurry discharged from the upper end of separator and containing $NH_4Cl$ is filtered and dehydrated to obtain $NH_4Cl$ substantially free from sodium chloride. When it is desired to precipitate ammonium chloride under these conditions, the sufficient reaction time is 20 minutes.

The following examples are given by way of illustration and are not intended as limitation on the scope of this invention.

Example 1

A liquor obtained by filtering off sodium bicarbonate at 25° C. and 135 g. per liter of liquor of solid sodium chloride having particle sizes of 20 to 40 mesh (20%), 40 to 50 mesh (30%), and smaller than 50 mesh (50%), are continuously added with stirring to the reaction vessel which has been cooled to 18° C. to precipitate ammonium chloride. The overflowing reaction mixture is continuously passed at the velocity of 0.8 cm./sec. through a flow separator of 10 cm. in diameter and 100 cm. in height which has a successive temperature gradient of 4° C. and has a top temperature of 14° C. and a bottom temperature of 18° C. A slurry of ammonium chloride which has overflowed from the flow separator is dehydrated by a centrifugal separator after filtration. Analysis of a sample taken from the final ammonium chloride product obtained at discharge 8 of the separator with samples taken from the reaction vessel and the flow separator (bottom and center) shows the following decrease in NaCl content:

|  | Percent of the total solid |
|---|---|
| Sodium chloride in the reaction vessel | 16 |
| Sodium chloride in the bottom of the flow separator (at 18° C.) | 43 |
| Sodium chloride in the center of the flow separator | 2.7 |
| Sodium chloride in the final product obtained at discharge 8 | 0.5 |

Under the microscope, sodium chloride contained in the said final product does not exist as a crystal but is present only in solution in the liquor adhering to the ammonium chloride crystals.

When trying to dissolve NaCl at 14° C. in the liquor stripped off the last mentioned ammonium chloride crystals, it is found that this liquor does not dissolve any sodium chloride. From this it is obvious that the stripped-off liquor is indeed saturated with NaCl at 14° C., and that the method according to the invention permits to dissolve sufficient amounts of sodium chloride in the mother liquor under saturated conditions to preserve the ammonium chloride crystals constituting the final product practically free therefrom.

*Example 2*

A liquor (30° C.) of pH 8.5 containing 4.2 mol/l. of ammonium chloride, 1.5 mol/l. of NaCl and 0.7 mol/l. of alkali value equivalent to bicarbonate, and solid sodium chloride having particle sizes of 20 to 40 mesh (20%), 40 to 50 mesh (30%), and smaller than 50 mesh (50%), are continuously fed into a reaction vessel provided with a cooler and maintained at 12° C., and subjected to a vigorous agitation for reaction. The reaction mixture overflowing from the vessel is passed through a liquid cyclone to eliminate large size crystals of sodium chloride therefrom and then returned to the vessel. The crystals of ammonium chloride and a liquor containing 2.1%, based upon the crystals, of solid sodium chloride, are introduced into a cooler and again cooled to 10° C. to filter the crystals of ammonium chloride. The ammonium chloride thus obtained does not include any crystal of sodium chloride, and sodium chloride in the liquor is substantially completely saturated.

What is claimed is:

1. A method for producing (1) ammonium chloride crystals substantially free from sodium chloride and (2) a liquor saturated with sodium chloride, from the sodium bicarbonate mother liquor of the ammonia-soda process, from which mother liquor solid sodium bicarbonate has been removed, comprising:
   (a) adding a mixture of larger and smaller sized sodium chloride crystals having particle sizes within the range of 20 to 100 mesh, a substantial portion of which has particle sizes larger than 40 mesh and another substantial portion of which has particle sizes smaller than 50 mesh in excess above the amount required for saturation with NaCl, to the said sodium bicarbonate mother liquor while stirring and cooling the same to a temperature sufficiently low to obtain ammonium chloride in flocculent form therein;
   (b) conveying the resulting slurry toward a separation zone at a flow rate sufficient to maintain said ammonium chloride of flocculent form as well as the smaller sized sodium chloride crystals therein in said slurry and simultaneously applying sedimenting forces thereto, thereby removing essentially only the larger sized sodium chloride particles from said slurry, and
   (c) subjecting the resulting slurry free from larger-sized sodium chloride crystals to further cooling in said separation zone at a temperature decreasing throughout the length of said zone by about 2 to 5 degrees centigrade below the temperature prevailing at step (b) until all smaller sized sodium chloride crystals are completely dissolved, thereby saturating the liquid part of said slurry with NaCl at said lower temperature while precipitating said ammonium chloride in the form of separable crystals substantially free from sodium chloride, and
   (d) separating the ammonium chloride crystals from said sodium chloride-saturated liquor.

2. A method for producing (1) ammonium chloride crystals substantially free from sodium chloride and (2) a liquor saturated with sodium chloride, from the sodium bicarbonate mother liquor of the ammonia-soda process, from which mother liquor solid sodium bicarbonate has been removed, comprising:
   (a) adding a mixture of larger and smaller sized sodium chloride crystals having particle sizes within the range of 20 to 100 mesh, a substantial portion of which has particle sizes larger than 40 mesh and another substantial portion of which has particle sizes smaller than 50 mesh in excess above the amount required for saturation with NaCl, to the said sodium bicarbonate mother liquor while stirring and cooling the same to a temperature sufficiently low to obtain ammonium chloride in flocculent form therein;
   (b) conveying the resulting slurry toward a separation zone at a flow rate of about 0.3 to 0.9 centimeters per second and simultaneously applying sedimenting forces thereto, thereby removing essentially only the larger sized sodium chloride particles from said slurry, and
   (c) subjecting the resulting slurry free from larger-sized sodium chloride crystals to further cooling in said separation zone at a temperature decreasing throughout the length of said zone by about 2 to 5 degrees centigrade below the temperature prevailing at step (b) until all smaller sized sodium chloride crystals are completely dissolved, thereby saturating the liquid part of said slurry with NaCl at said lower temperature while precipitating said ammonium chloride in the form of separable crystals substantially free from sodium chloride, and
   (d) separating the ammonium chloride crystals from said sodium chloride-saturated liquor.

3. A method for producing (1) ammonium chloride crystals substantially free from sodium chloride and (2) a liquor saturated with sodium chloride from the sodium bicarbonate mother liquor of the ammonia-soda process, from which mother liquor solid sodium bicarbonate has been removed, comprising:
   (a) adding a mixture of larger and smaller sized sodium chloride crystals having particle sizes within the range of 20 to 100 mesh, a substantial portion of which has particle sizes larger than 40 mesh and another substantial portion of which has particle sizes smaller than 50 mesh, in excess above the amount required for saturation with NaCl, to the said sodium bicarbonate mother liquor while stirring and cooling the same to about 12° to 18° C., thereby obtaining ammonium chloride in flocculent form therein;
   (b) conveying the resulting slurry toward a separation zone at a flow rate of about 0.3 to 0.9 centimeters per second and simultaneously applying sedimenting forces thereto, thereby removing essentially only the larger sized sodium chloride particles from said slurry, and
   (c) subjecting the resulting slurry free from larger-sized sodium chloride crystals to further cooling in said separation zone at a temperature decreasing throughout the length of said zone by about 2 to 5 degrees centigrade below the temperature prevailing at step (b) until all smaller sized sodium chloride crystals are completely dissolved, thereby saturating the liquid part of said slurry with NaCl at said lower temperature while precipitating said ammonium chloride in the form of separable crystals substantially free from sodium chloride, and (d) separating the ammonium chloride crystals from said sodium chloride-saturated liquor.

4. A method as described in claim 1, wherein the sedimenting forces applied in step (b) are those of gravity.

References Cited in the file of this patent

UNITED STATES PATENTS

| 356,133 | Jarmay | Jan. 18, 1887 |
| 1,416,772 | Bacon | May 23, 1922 |
| 1,913,372 | Cole | June 13, 1933 |
| 2,443,817 | Draeger et al. | June 22, 1948 |

FOREIGN PATENTS

| 131,870 | Great Britain | Feb. 12, 1920 |